US012578623B2

(12) United States Patent
Matsumoto

(10) Patent No.: US 12,578,623 B2
(45) Date of Patent: Mar. 17, 2026

(54) IMAGE CAPTURING APPARATUS CAPABLE OF REDUCING EXPOSURE VARIATION BETWEEN UPPER AND LOWER END AREAS OF IMAGE, METHOD OF CONTROLLING IMAGE CAPTURING APPARATUS, AND STORAGE MEDIUM

(71) Applicant: CANON KABUSHIKI KAISHA, Tokyo (JP)

(72) Inventor: Yukihiro Matsumoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 265 days.

(21) Appl. No.: 18/452,171

(22) Filed: Aug. 18, 2023

(65) Prior Publication Data

US 2024/0077783 A1 Mar. 7, 2024

(30) Foreign Application Priority Data

Aug. 23, 2022 (JP) ................................. 2022-132614

(51) Int. Cl.
*G03B 7/16* (2021.01)
*G03B 9/70* (2021.01)
*H04N 23/745* (2023.01)

(52) U.S. Cl.
CPC ................. *G03B 7/16* (2013.01); *G03B 9/70* (2013.01); *H04N 23/745* (2023.01)

(58) Field of Classification Search
CPC ........... H04N 23/73; G03B 7/00; G03B 15/05
See application file for complete search history.

(56) References Cited

U.S. PATENT DOCUMENTS

| 2012/0188432 A1* | 7/2012 | Kubota | ................ | H04N 25/443 |
| | | | | 348/E5.037 |
| 2014/0218416 A1* | 8/2014 | Suzuki | ..................... | G09G 5/10 |
| | | | | 345/690 |
| 2018/0011387 A1* | 1/2018 | Murashima | .......... | H04N 23/683 |
| 2018/0048795 A1* | 2/2018 | Shintani | ............... | H04N 23/671 |
| 2022/0163867 A1* | 5/2022 | Tani | .......................... | G03B 7/00 |

FOREIGN PATENT DOCUMENTS

JP        2008-060640 A      3/2008

* cited by examiner

*Primary Examiner* — Noam Reisner
(74) *Attorney, Agent, or Firm* — Cowan, Liebowitz & Latman, P.C.

(57) ABSTRACT

An image capturing apparatus capable of reducing exposure variation in opposite end areas of an image when photographing is performed with flash light emission while shortening a flash synchronization time. A system controller determines a shutter speed for flash light emission photographing. The system controller selectively executes first control for controlling a traveling speed of a front curtain of a shutter and a traveling speed of a rear curtain of the shutter to the same speed, and second control for controlling the traveling speed of the front curtain to be higher than the traveling speed of the rear curtain. Before flash light emission photographing is performed, the system controller determines which of the first control and the second control is to be adopted according to the shutter speed.

14 Claims, 10 Drawing Sheets

FULL-SIZE

FULL-SIZE
16:9

APS-C

APS-C
16:9

IMAGE CAPTURING APPARATUS CAPABLE OF REDUCING EXPOSURE VARIATION BETWEEN UPPER AND LOWER END AREAS OF IMAGE, METHOD OF CONTROLLING IMAGE CAPTURING APPARATUS, AND STORAGE MEDIUM

BACKGROUND OF THE INVENTION

Field of the Invention

The present invention relates to an image capturing apparatus that is capable of reducing exposure variation between upper and lower end areas of an image, a method of controlling the image capturing apparatus, and a storage medium.

Description of the Related Art

Conventionally, a focal plane-type shutter of an image capturing apparatus has a front curtain for starting exposure and a rear curtain for terminating exposure. The types of the shutter include one that has the front and rear curtains each using a mechanical shutter system (mechanical shutter type) and one that has the front and rear curtains each using an electronic shutter system (electronic shutter type). Further, the types of the shutter also include a mixed type having the front curtain using the electronic shutter system and the rear curtain using the mechanical shutter system (electronic front curtain type).

In flash photographing using the focal plane-type shutter, flash light emission is permitted when the shutter fully opens for an image sensor, that is, when traveling of the front curtain of the shutter is completed. Then, after the flash light emission, the rear curtain is caused to travel at a timing when the peak value of a signal becomes a predetermined amount of light compared with the maximum value of the amount of light emission. Thus, a shutter speed is determined at which a shutter-fully open time period during which the shutter is fully open becomes the shortest. The shutter-fully open time period corresponding to the shutter speed is referred to as the flash synchronization time.

Japanese Laid-Open Patent Publication (Kokai) No. 2008-060640 discloses a technique for shortening, when flash photographing is performed in an image capturing apparatus of the electronic front curtain type, the flash synchronization time by always making the traveling time of the electronic shutter of the front curtain shorter than the traveling time of the mechanical shutter of the rear curtain to advance the light emission timing.

However, in the technique disclosed in Japanese Laid-Open Patent Publication (Kokai) No. 2008-060640, when flash photographing is performed, since the traveling speed of the front curtain and that of the rear curtain are different, the charge accumulation time always differs between the upper and lower areas of the captured image. For this reason, the exposure is always varied between the upper and lower areas of the image, which causes so-called exposure variation.

SUMMARY OF THE INVENTION

The present invention provides an image capturing apparatus that is capable of reducing exposure variation between upper and lower end areas of an image when photographing is performed with flash light emission while shortening a flash synchronization time, a method for controlling the image capturing apparatus, and a storage medium.

In a first aspect of the present invention, there is provided an image capturing apparatus including at least one processor, and a memory coupled to the at least one processor, the memory having instructions that, when executed by the processor, perform the operations as a determination unit configured to determine parameters including a shutter speed before flash light emission photographing is performed, and a control unit configured to selectively execute first control for controlling a traveling speed of a front curtain of a shutter and a traveling speed of a rear curtain of the shutter to the same speed, and second control for controlling the traveling speed of the front curtain to be higher than the traveling speed of the rear curtain, wherein, before flash light emission photographing is performed, the control unit determines which of the first control and the second control is to be adopted according to the shutter speed in the parameters, which is determined by the determination unit.

In a second aspect of the present invention, there is provided a method of controlling an image capturing apparatus, including determining parameters including a shutter speed before flash light emission photographing is performed, and performing selective execution of first control for controlling a traveling speed of a front curtain of a shutter and a traveling speed of a rear curtain of the shutter to the same speed, and second control for controlling the traveling speed of the front curtain to be higher than the traveling speed of the rear curtain, wherein said selective execution includes, before flash light emission photographing is performed, determining which of the first control and the second control is to be adopted according to the shutter speed in the determined parameters.

According to the present invention, it is possible to reduce exposure variation between upper and lower end areas of an image when photographing is performed with flash light emission while shortening the flash synchronization time.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
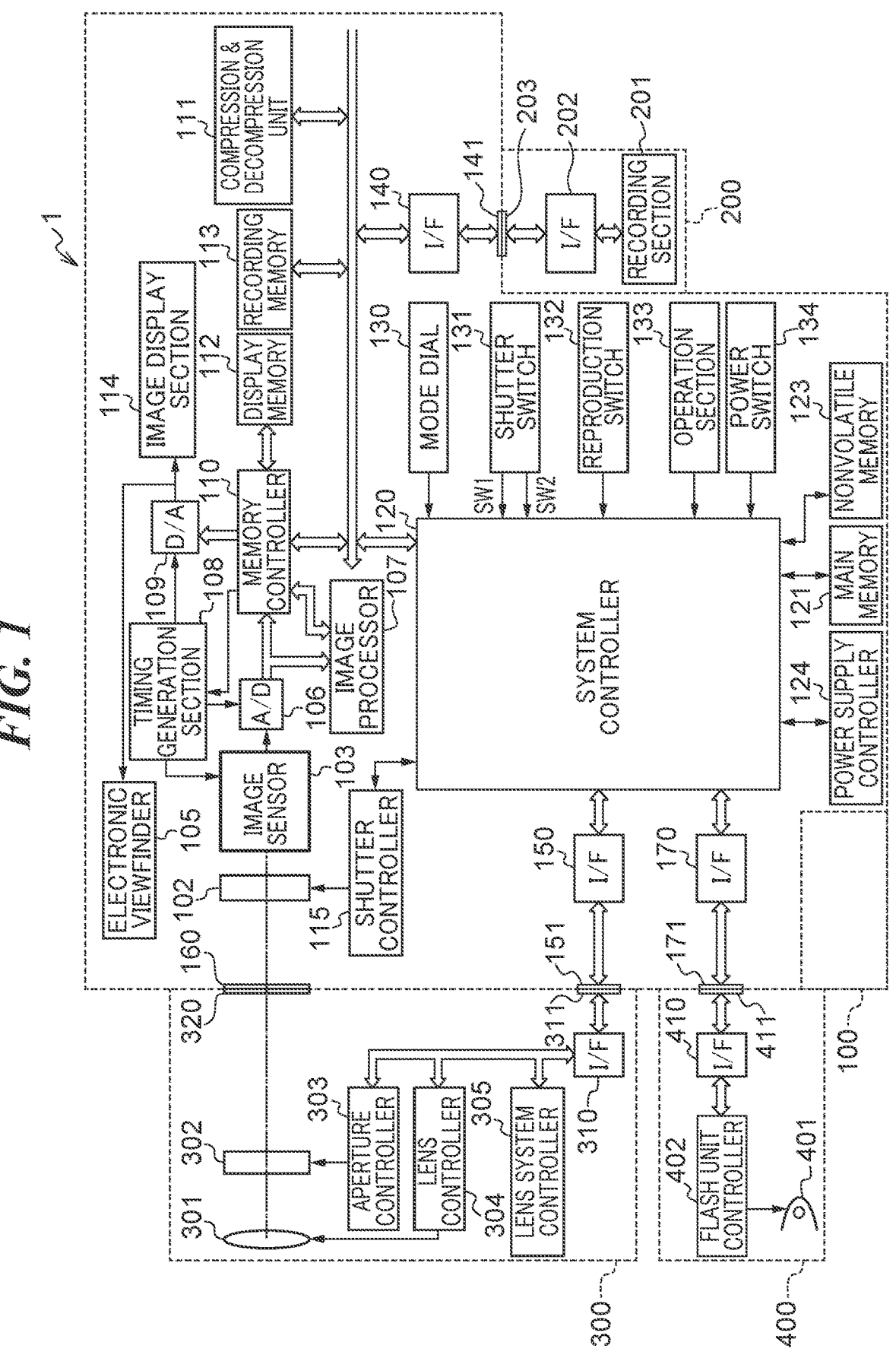
FIG. 1 is a block diagram of an image capturing apparatus.
Figure 2:
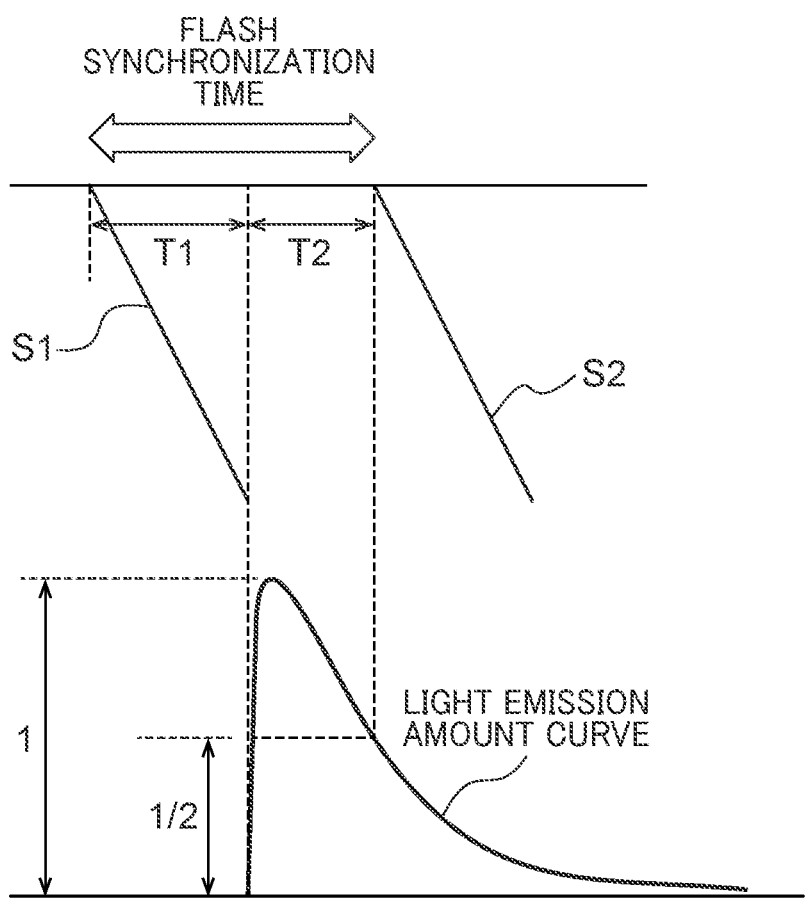
FIG. 2 is a conceptual diagram showing a relationship between a travel pattern of a front curtain and a travel pattern of a rear curtain.

FIG. 1 is a block diagram of an image capturing apparatus according to an embodiment of the present invention. This image capturing apparatus is a digital camera (hereafter simply referred to as the camera) by way of example. One or more of functional blocks appearing in FIG. 1 may be realized by hardware, such as an application-specific integrated circuit (ASIC) or a programmable logic array (PLA), or may be realized by a programmable processor, such as a central processing unit (CPU) or a micro processing unit (MPU), executing software. Alternatively, one or more of the functional blocks may be realized by a combination of software and hardware. Therefore, even in a case where different functional blocks are described as operation subjects in the following description, the functional blocks may be realized by the same hardware as an operation subject.

Note that the camera 1 includes a camera unit 100, an external recording medium 200, a lens unit 300, and a flash unit 400, and is a so-called lens-interchangeable type image capturing apparatus but is not limited to this. For example, the camera 1 may be configured such that the camera unit 100 and at least one of the lens unit 300 and the flash unit 400 are integrally formed with each other.

In the camera unit 100, the type of front and rear curtains of a shutter 102 may be either a mechanical shutter type or an electronic shutter type insofar as the control of elements including a traveling speed can be changed. If both of the front and rear curtains are of the mechanical shutter type, the shutter 102 functions as a light blocking member for opening and blocking an optical path between the lens unit 300 and an image sensor 103. If the front curtain is of the electronic shutter type, charges accumulated in the image sensor 103 in a horizontal direction are reset by front curtain control. If the rear curtain is of the electronic shutter type, charges accumulated in each line of the image sensor 103 are sequentially read out by rear curtain control.

In the present embodiment, it is assumed that the front curtain is of the electronic shutter type, and the rear curtain is of the mechanical shutter type or the electronic shutter type, but this is not limitative.

The image sensor 103 is a charge-accumulating type solid-state image sensor, such as a charge coupled device (CCD) or a complementary metal-oxide semiconductor (CMOS) sensor, and generates analog image data by photoelectrical conversion of light flux incident through the lens unit 300 from an object (image capturing of the object). An electronic viewfinder 105 uses a thin-film transistor (TFT)-type liquid crystal display (LCD), an organic electroluminescence (EL) device, or the like, and enables a user to confirm an object image.

An analog-to-digital conversion section 106 converts analog image data output from the image sensor 103 to digital image data. An image processor 107 performs a variety of processing operations, including white balance adjustment processing and gradation processing, on the digital image data output from the analog-to-digital conversion section

106. A timing generation section 108 generates signals (clock signal and the like control signals) for operating the image sensor 103, the analog-to-digital conversion section 106, a digital-to-analog conversion section 109, and so forth. Further, the timing generation section 108 can control accumulation and readout of charges in the image sensor 103 by controlling the reset timing and the readout timing of the accumulated charges in the image sensor 103. The timing generation section 108 is controlled by a system controller 120.

A memory controller 110 controls the analog-to-digital conversion section 106, the image processor 107, the digital-to-analog conversion section 109, and a compression and decompression unit 111 to perform processing for writing acquired image data into a display memory 112 or a recording memory 113.

Similar to the electronic viewfinder 105, a TFT-type LCD, an organic EL element, or the like is adopted for an image display section 114. Digital image data for display, written in the display memory 112, is converted to analog image data for display by the digital-to-analog conversion section 109, and then displayed on the electronic viewfinder 105 or the image display section 114.

The recording memory 113 has a storage capacity sufficient to store a predetermined number of still image data items and moving image data items, and stores image data acquired by capturing images of objects. The recording memory 113 can also be used as a work area for the system controller 120.

The compression and decompression unit 111 reads image data stored in the recording memory 113 and compresses and decompresses the read image data by a predetermined image compression method and an image decompression method, respectively, according to a variety of uses. A shutter controller 115 controls the operation of the shutter 102 based on a result of photometry on an object, which is calculated by the system controller 120. The shutter 102 can be controlled in conjunction with a diaphragm 302.

The system controller 120 performs centralized control of the operations of the camera 1. Based on image data captured by the image sensor 103, the system controller 120 performs exposure control, and focus control according to a result of focus detection. For example, the system controller 120 uses the image data captured by the image sensor 103 to perform lens position control (focus control) based on contrast information of the image data acquired while shifting the position of the focus lens. Further, as another focus control method, the system controller 120 may adopt a method of detecting an in-focus state of an optical image from a phase difference between two images of an object based on the captured image data and performing the lens position control (focus control) based on a result of this focus detection.

The system controller 120 can also perform flicker detection for detecting whether or not there is a flicker in a photographing environment, using the captured image data. Further, the system controller 120 can also perform the photometry operation for calculating a luminance value of an object using the captured image data. As the exposure control performed when capturing an image of an object to acquire image data, the system controller 120 adjusts exposure parameters, including an aperture value, a shutter speed, and a photographic sensitivity (ISO speed).

Note that the aperture value is a parameter related to the opening of the diaphragm 302. The shutter speed is a parameter related to the charge accumulation time in the image sensor 103. The photographic sensitivity is a parameter related to an analog gain amount and a digital gain amount.

The system controller 120 controls the flash unit 400 according to a result of the photometry operation, camera settings, and a state of the flash unit 400 to thereby control the amount of light emission and the light emission timing of the flash unit 400. Further, the system controller 120 can switch the image capturing range of the image sensor 103 according to user settings set by operating an operation section 133, to thereby perform photographing using pixel outputs from the whole surface of the image sensor or photographing using pixel outputs from a cut-out part of the whole surface.

As described above, based on a variety of information, including a luminance value of an object, exposure control, and associated settings, the system controller 120 can perform proper exposure and flash control dependent on the luminance value of the object, and change a range of image capturing by the image sensor 103.

In a main memory 121, data items are recorded which are related to the operation of the camera 1, including information on exposure (proper exposure) values with respect to luminance values (program diagram based on table data and the like), constants for operations executed by the camera 1, a variety of exposure conditions, and calculation formulas. A nonvolatile memory 123 is an electrically erasable programmable read-only memory (EEPROM), represented e.g. by a flash memory, and data can be electrically stored and erased.

Operating members for inputting a variety of operation instructions to the system controller 120 will be described below. Each operating member is formed by a button, a switch, a dial, a touch panel, a sight line detection device, or a voice recognition device, or by a combination of ones of these components.

First, a mode dial 130 is used when a user sets a desired photographing mode by selecting from a plurality of photographing modes that can be set by the camera unit 100. The photographing modes that can be set include a still image mode for photographing a still image and a moving image mode for recording a moving image. In both of the still image photographing mode and the moving image photographing mode, it is possible to set a variety of modes in which the exposure parameters can be automatically or manually set, including an automatic mode, a program mode, an aperture priority mode, a shutter speed priority mode, and a manual mode. Further, in the still image mode, the user can set whether or not to perform flash light emission when photographing a still image.

In the still image photographing, it is possible to realize a live view display function for displaying an image (live view image) on the electronic viewfinder 105 or the image display section 114 for the user to confirm an object. The live view display function is for sequentially displaying a plurality of acquired image data items by continuously executing charge accumulation (image capturing) using the image sensor 103.

A shutter switch 131 is used for instructing the start of a photographing preparation operation or a photographing operation for an object. A SW1 of the shutter switch 131 is turned on by a first stroke (e.g. half-pressing) of the shutter switch 131. When the SW1 is turned on, the photographing preparation operation is started, and the system controller 120 starts the focus control, the exposure control, and the auto white balance (AWB) processing, and so forth. A SW2 of the shutter switch 131 is turned on by a second stroke (e.g.

full-pressing) of the shutter switch 131. When the SW2 is turned on, the photographing operation is started, and the system controller 120 starts exposure processing and recording processing related to charge accumulation (image capturing) using the image sensor 103.

In the exposure processing, in response to an instruction from the system controller 120, signals read from the image sensor 103 are written into the recording memory 113 as image data via the analog-to-digital conversion section 106 and the memory controller 110. Then, in response to an instruction from the system controller 120, development processing based on a variety of arithmetic operations performed by the image processor 107 and the memory controller 110 is performed on this image data, and the developed image data is written into the recording memory 113.

In the recording processing, the image data subjected to the development processing, which is read from the recording memory 113, is compressed by the compression and decompression unit 111 according to an instruction from the system controller 120. Then, in response to an instruction from the system controller 120, the compressed image data is written into a recording section 201 of the external recording medium 200 via a first camera interface (I/F) 140, a first camera connector 141, a media connector 203, and a media I/F 202.

A reproduction switch 132 is used to instruct the start of reproduction processing. When the reproduction switch 132 is pressed, acquired image data is read from the recording memory 113 or the external recording medium 200 and is displayed on the image display section 114.

The operation section 133 is used to configure a variety of settings associated with menu display and photographing, and a variety of settings associated with reproduction. For example, the user can set not only a variety of settings for flash photographing, and a shutter speed, an aperture value, an ISO speed, and so forth, which are used at the time of photographing, but also an image capturing range of the image sensor 103, as will be described hereinafter with reference to FIG. 8. In the present embodiment, the user can also set whether or not to perform flash light emission when photograph a still image, a shutter speed at the time of flash photographing, and so forth.

A power switch 134 is used to switch on/off power supply to the components of the camera 1 from a power source (battery), not shown. Note that by operating the power switch 134, it is possible to switch power supply not only to the camera unit 100 but also to a variety of accessory devices connected to the camera unit 100, including the lens unit 300 and the external recording medium 200.

A power supply controller 124 includes a battery detection circuit, a DC-DC converter, a switch circuit used to switch between blocks to be energized, and so forth. The power supply controller 124 detects whether or not a battery is attached, and a type and a remaining amount of the battery, and supplies required voltage to the components of the camera 1 for a required time period, based on an instruction given from the system controller 120 according to an operation of the power switch 134.

A second camera I/F 150 is provided in a camera mount 160 for connecting between the camera unit 100 and the lens unit 300. A second camera connector 151 connected to the second camera I/F 150 electrically connects between the camera unit 100 and the lens unit 300 via a lens connector 311 and a lens I/F 310.

A third camera I/F 170 is an interface for connecting between the camera unit 100 and the flash unit 400. A third camera connector 171 connected to the third camera I/F 170 electrically connects between the camera unit 100 and the flash unit 400 via a flash unit connector 411 and a flash unit I/F 410.

The second camera connector 151 and the third camera connector 171 transmit control signals, status signals, data signals, and the like, between the camera unit 100, and the lens unit 300 and the flash unit 400. Further, it is possible to supply current of various voltages to the lens unit 300 and the flash unit 400 via the second camera connector 151 and the third camera connector 171. Note that the second camera connector 151 and the third camera connector 171 may be configured to be capable of transmitting not only electrical communication but also optical communication, voice communication, and so forth.

The external recording medium 200 is an external recording device, such as a memory card and a hard disk. The external recording medium 200 is equipped with the recording section 201 implemented e.g. by a semiconductor memory or a magnetic disk, and the media I/F 202 for interfacing with the camera unit 100. Further, the external recording medium 200 is also equipped with the media connector 203 for connection to the camera unit 100.

The lens unit 300 is an optical device which can be attached to and removed from the camera unit 100. A lens mount 320 is engaged with the camera mount 160 to make the lens unit 300 mechanically attachable to the camera unit 100.

Although illustrated as a separate member from the lens mount 320, in actuality, the lens connector 311 is provided inside the lens mount 320, for electrically connecting between the lens unit 300 and the camera unit 100. The lens connector 311 transmits control signals, status signals, data signals, and so forth, between the lens unit 300 and the camera unit 100.

A photographic lens group 301 is an optical member including a focus lens, a zoom lens, a shift lens, and so forth. The diaphragm 302 adjusts the light amount of light flux from an object, which passes through the photographic lens group 301 and enters the image sensor 103. An aperture controller 303 controls the opening amount of the diaphragm 302 according to an instruction from the system controller 120. The system controller 120 instructs the aperture controller 303 to change the aperture diameter of the diaphragm 302 such that the opening amount of the diaphragm 302 becomes equal to an opening amount corresponding to a target aperture value.

The aperture diameter of the diaphragm 302, being changed, is sequentially detected by intercommunication between the lens unit 300 and the camera unit 100. Then, when the aperture diameter of the diaphragm 302 reaches the aperture diameter corresponding to the target aperture value, the system controller 120 terminates changing the aperture diameter of the diaphragm 302.

A lens controller 304 controls the operation (driving) of the photographic lens group 301. The lens controller 304 can detect a lens position (focal position) of the focus lens, and information on the detected lens position is transmitted to the camera unit 100.

A lens system controller 305 performs centralized control of the lens unit 300. The lens system controller 305 incorporates a CPU, a volatile memory, and a nonvolatile memory, none of which are shown. The volatile memory stores constants, variables, programs for the operations, and so forth, and the nonvolatile memory stores identification information, such as a unique number associated with the lens unit 300, management information, and functional information, such as an open aperture value, a minimum aperture value, and a focal length.

The flash unit 400 is an accessory (flash device) which can be attached to and removed from the camera unit 100. The flash unit connector 411 transmits control signals, status signals, data signals, and so forth, between the flash unit 400 and the camera unit 100. Further, it is also possible to receive and supply current of various voltages via the flash unit connector 411. Note that the flash unit connector 411 may be configured to be capable of transmitting not only electrical communication but also optical communication, voice communication, and the like. A flash unit controller 402 performs light emission control according to an amount of light emitted by a flash light emitting section 401 and a variety of settings of the flash unit 400.

FIGS. 2 to 5 are conceptual diagrams each showing a relationship between a travel pattern of the front curtain and a travel pattern of the rear curtain in the electronic front-curtain system. A curve indicated by a symbol S1 represents a scanning pattern (traveling curve) of reset scan performed by the electronic front curtain. A curve indicated by a symbol S2 represents a raveling curve of the mechanical rear curtain.

If both of the front curtain and the rear curtain are of the mechanical shutter type, the image sensor 103 is exposed to light by traveling of the front curtain of the shutter, and blocked from light by the rear curtain of the shutter. If both of the front curtain and the rear curtain are of the electronic shutter type, accumulated charges in the image sensor 103 in a horizontal direction are reset by the front curtain control, and charges accumulated in each line of the image sensor 103 are sequentially read out by the rear curtain control.

In each of FIGS. 2 to 5, time T1 represents a traveling time of the front curtain of the shutter. In the case of the electronic front-curtain system, the time T1 is a time period required for the front curtain to perform charge accumulation reset scan of the image sensor 103. In each figure, a light emission amount curve represents temporal changes in the light emission amount occurring when flash light emission is performed. A maximum value of the light emission amount is represented by 1, and an amount of light emission reduced to half of the maximum value is represented by ½. A time period from the start of flash light emission to a time at which the amount of light emission is reduced to half to start traveling of the rear curtain is represented by time T2. The traveling of the rear curtain is started after the light amount is reduced to a predetermined amount, and hence the time T2 is a full open section during which the shutter is fully open, and a time period obtained by T1+T2 is the flash synchronization time.

A traveling speed of the front curtain is a speed of reset scan performed on accumulated charges in the image sensor 103 and corresponds to an inclination of the curve S1. A traveling speed of the rear curtain is a speed at which a leading edge of the mechanical rear curtain passes over the imaging surface of the image sensor 103 and corresponds to an inclination of the curve S2.

Conventionally, in the electronic shutter system and the electronic front curtain system, the inclinations of the traveling curves of the front curtain and the rear curtain are made equal to each other. Therefore, the flash synchronization time is determined by the time T1 as the traveling time of the front curtain and the time T2 as the full open section. To shorten the flash synchronization time, there are envisaged methods of increasing the traveling speed of the shutter (reducing a reset time period or a readout time period for accumulated charges, in the case of the electronic shutter) or reducing a light emission time period (reducing the light emission amount or making earlier the time at which the light emission amount is reduced to half). These methods will be described with reference to FIGS. 3 to 5, in comparison with FIG. 2.

Figure 3:
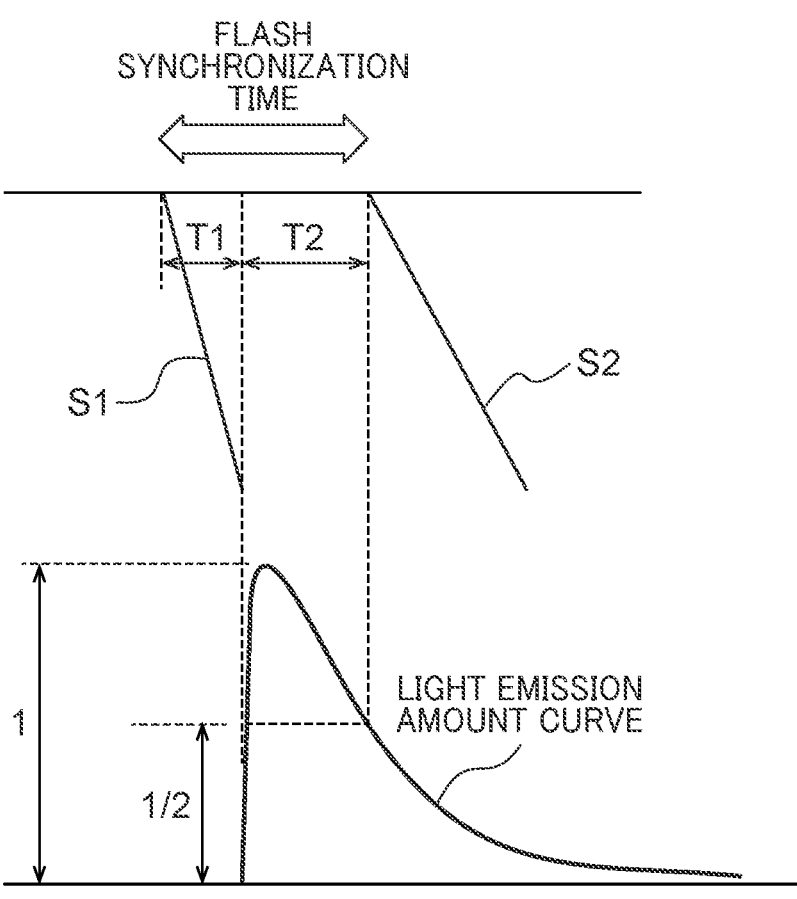
FIG. 3 is another conceptual diagram showing a relationship between a travel pattern of the front curtain and a travel pattern of the rear curtain.

FIG. 3 is a diagram showing an example of control for shortening the flash synchronization time by increasing the traveling speed of the front curtain. By increasing the traveling speed of the front curtain, the inclination of the curve S1 becomes large, and the time T1 is reduced. This makes it possible to advance the start timing of flash light emission, whereby the flash synchronization time is shortened.

Figure 4:
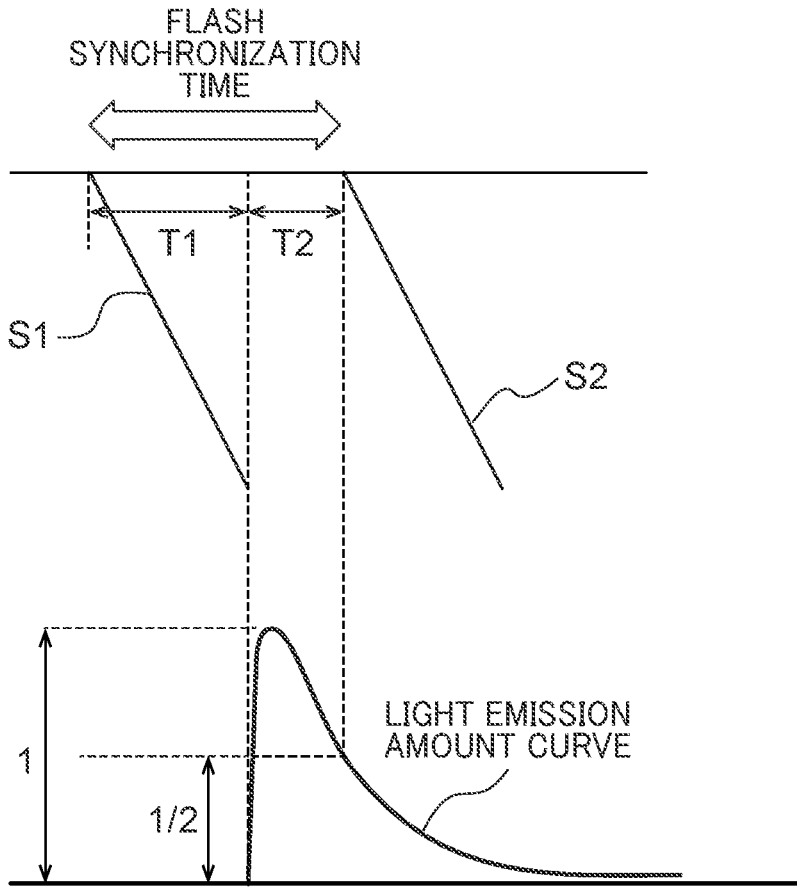
FIG. 4 is another conceptual diagram showing a relationship between a travel pattern of the front curtain and a travel pattern of the rear curtain.
Figure 5:
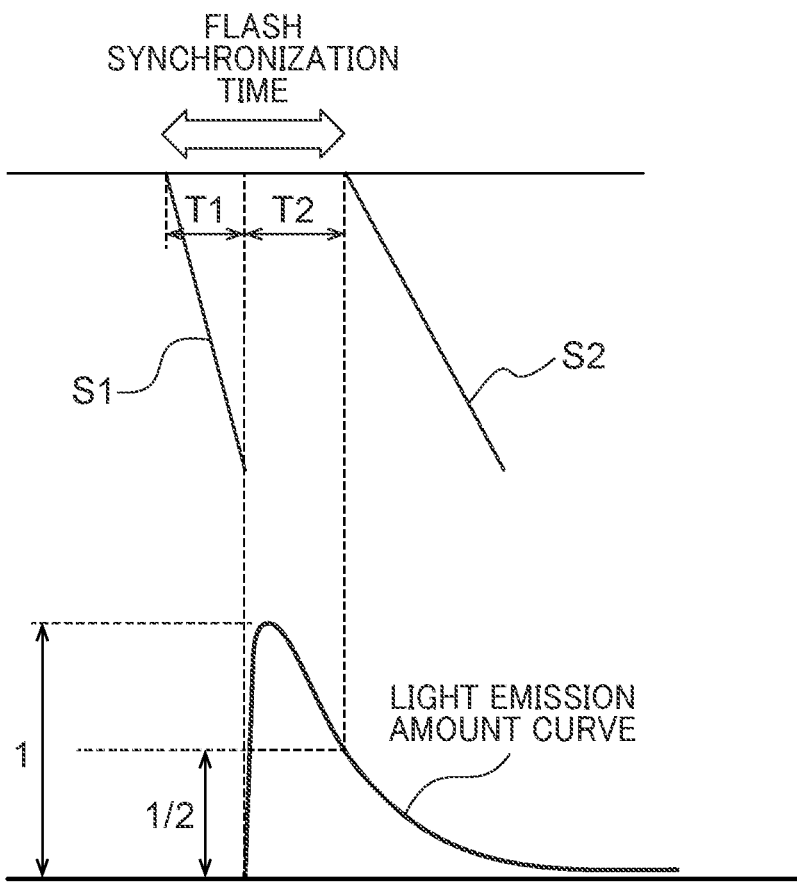
FIG. 5 is another conceptual diagram showing a relationship between a travel pattern of the front curtain and a travel pattern of the rear curtain.

FIG. 4 is a diagram showing an example of control for shortening the flash synchronization time by limiting the amount of flash light emission. Note that the heights of the peaks of the light emission amounts in FIGS. 2 to 5 are expressed in relative amounts, and the light emission amounts in FIGS. 4 and 5 are smaller than the light emission amounts in FIGS. 2 and 3. As shown in FIG. 4, by limiting the amount of flash light emission, the time T2 is shortened. This makes it possible to advance the traveling start time of the rear curtain, whereby the flash synchronization time is shortened.

FIG. 5 is a diagram showing an example of control for shortening the flash synchronization time by increasing the traveling speed of the front curtain and limiting the amount of flash light emission at the same time. In this case, both of the effect described with reference to FIG. 3 and the effect described with reference to FIG. 4 are reflected, and hence the flash synchronization time is shortened.

Figure 6:
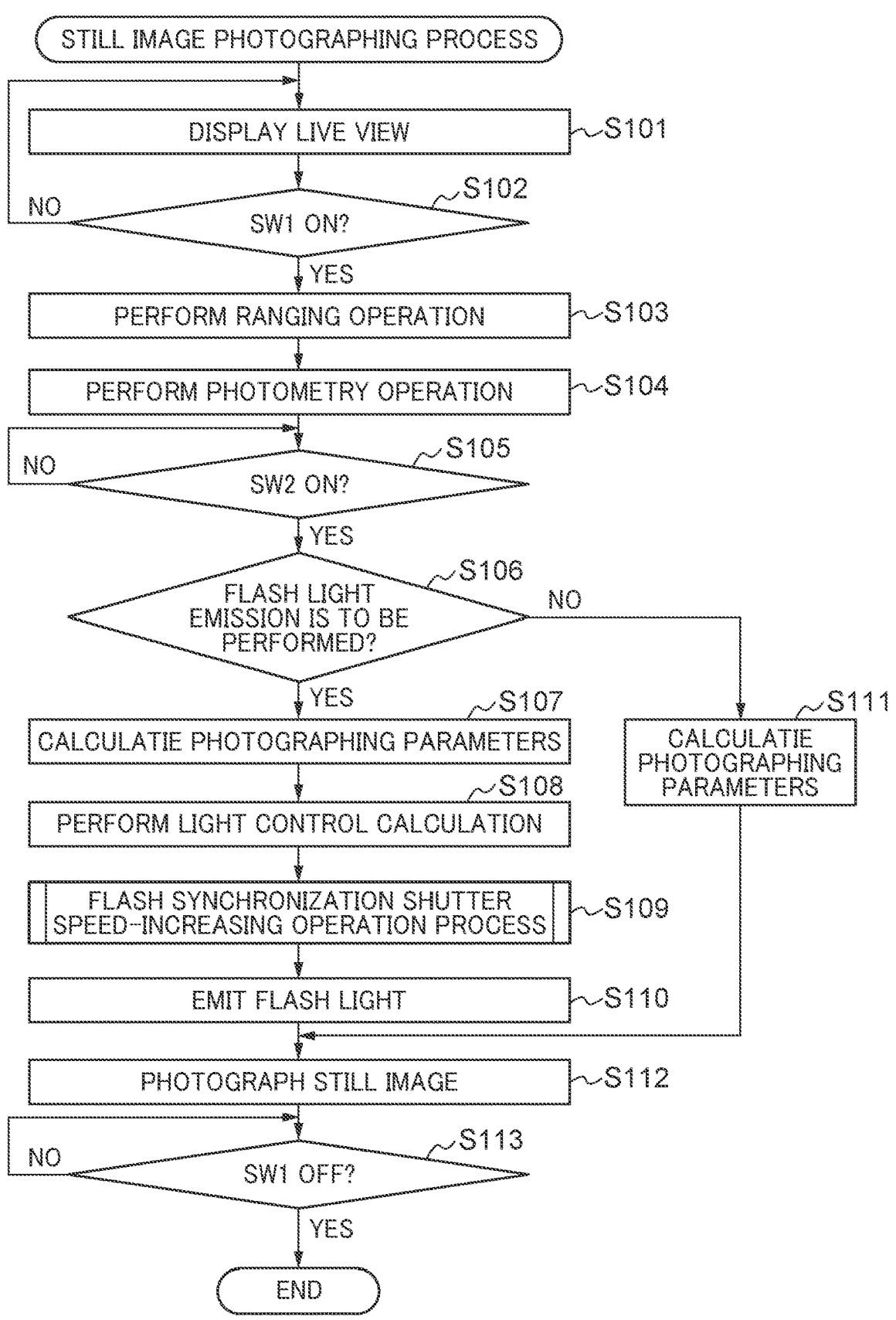
FIG. 6 is a flowchart of a still image photographing process.

FIG. 6 is a flowchart of a still image photographing process. This process is realized, for example, by a CPU of the system controller 120, loading a program stored in a ROM of the same, into a RAM of the same, and executing the loaded program. This process is started when the camera 1 is powered on. This process is terminated when the camera 1 is powered off.

In a step S101, the system controller 120 shifts the camera 1 to a photographing standby state and performs the live view display. In a step S102, the system controller 120 determines whether or not the SW1 of the shutter switch 131 is turned on. If the SW1 is not turned on, the system controller 120 returns to the step S101, whereas if the SW1 is turned on, the system controller 120 proceeds to a step S103.

In the step S103, the system controller 120 performs a ranging operation based on an image captured by the image sensor 103 and controls the photographic lens group 301 to adjust the focus based on a result of the ranging operation. In a step S104, the system controller 120 performs a photometry operation based on the image captured by the image sensor 103. As the method of this photometry operation, any suitable method including a well-known method may be adopted.

For example, the system controller 120 calculates an averaged luminance of each of a plurality of blocks (regions) into which the whole captured image is divided. Then, an averaged luminance of all the blocks is calculated, as a photometry result, from the averaged luminances of the blocks by applying a predetermined weight thereto, and the system controller 120 further performs, based on the photometry result, operations including determination of whether or not to cause the flash unit 400 to emit light at the time of still image photographing, and calculation of control values used when photographing is performed.

Next, in a step S105, the system controller 120 waits until the SW2 of the shutter switch 131 is turned on, and when the SW2 is turned on, the system controller 120 proceeds to a step S106. In the step S106, the system controller 120 determines whether or not to perform flash light emission photographing according to the photometry result obtained in the step S104 and the settings of the camera unit 100. The flash light emission photographing refers to causing the flash unit 400 to emit light when a still image is photographed. If forced light emission has been set, it is determined that flash light emission photographing is to be performed. If automatic light emission has been set, whether or not to perform flash light emission photographing is determined based on the photometry result.

If it is determined that flash light emission photographing is not to be performed, the system controller 120 proceeds to a step S111, whereas if it is determined that flash light emission photographing is to be performed, the system controller 120 proceeds to a step S107. In the step S107, the system controller 120 calculates the photographing parameters (a time value (Tv), an aperture value (Av), and an ISO speed) for flash light emission photographing, based on the photometry result obtained in the step S104 and a condition that photographing is to be performed with flash light emission. That is, the system controller 120 calculates the photographing parameters, such as a shutter speed (or a Tv value), an aperture value, and an ISO speed, for the case where still image photographing is performed with flash light emission. Note that "Tv" is an expression corresponding to an acronym of "time value", but in actuality in the present embodiment, the Tv value is used to mean a corresponding shutter speed.

In a step S108, the system controller 120 performs light control calculation to determine an amount of flash light emission at the time of still image photographing. The amount of flash light emission, calculated here, is referred to as the "provisionally determined flash light emission amount".

In a step S109, the system controller 120 executes a flash synchronization shutter speed-increasing operation process (see FIG. 7), described hereinafter. The system controller 120 causes flash light to be emitted in a step S110 and performs the still image photographing in a step S112. The amount of light emission in the step S110 is sometimes set to a different amount (limited value) from the provisionally determined flash light emission amount by the flash synchronization shutter speed-increasing operation process (see FIG. 7).

In the step S111, the system controller 120 calculates the photographing parameters for flash light non-emission based on the photometry result obtained in the step S104. That is, the system controller 120 calculates the photographing parameters, such as a shutter speed (or a Tv value), an aperture value, and an ISO speed, for the case where still image photographing is performed without flash light emission. Then, the system controller 120 proceeds to the step S112.

In a step S113, the system controller 120 waits until the shutter switch 131 is released (SW1 is turned off) after the still image photographing, and if the shutter switch 131 is released, the system controller 120 terminates the still image photographing process in FIG. 6. Note that after it is determined that the answer to the question of the step S113 is affirmative (YES), the process may return to the step S101.

Figure 7:
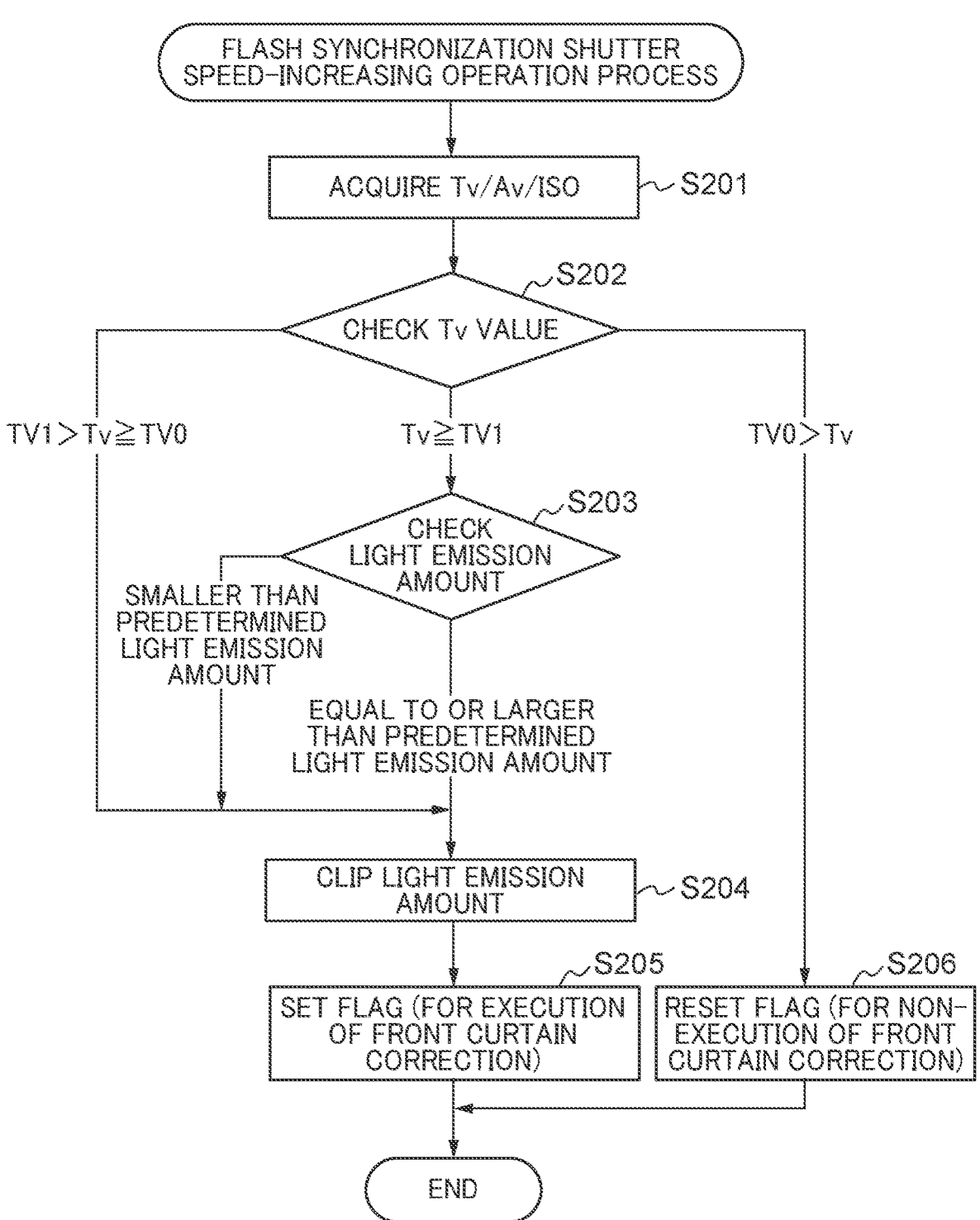
FIG. 7 is a flowchart of a flash synchronization shutter speed-increasing operation process.

FIG. 7 is a flowchart of the flash synchronization shutter speed-increasing operation process performed in the step S109 in FIG. 6.

In a step S201, the system controller 120 acquires the photographing parameters (Tv value, Av value, and ISO speed) for flash light emission photographing, calculated in the step S107. In a step S202, the system controller 120 checks whether the shutter speed is a high speed, an intermediate speed, or a low speed. Then, the process is branched to one of steps S206, S205 and S203 according to a result of the check.

Here, when the shutter speed is checked, TV0 and TV1 are used as threshold values to be compared with the Tv value as a photographing parameter. The threshold value TV0 corresponds to a first shutter speed, and the threshold value TV1 corresponds to a second shutter speed. The magnitude relation between the threshold values is TV1>TV0.

If TV0>Tv value holds, the shutter speed is lower than the first shutter speed, and hence it is determined that the shutter speed is the low speed. In this case, the system controller 120 proceeds to a step S206.

If TV1>Tv value≥TV0 holds, the shutter speed is equal to or higher than the first shutter speed and lower than the second shutter speed, and hence it is determined that the shutter speed is the medium speed. In this case, the system controller 120 proceeds to a step S205.

If Tv value≥TV1 holds, the shutter speed is equal to or higher than the second shutter speed, and hence it is determined that that the shutter speed is the high speed. In this case, the system controller 120 proceeds to a step S203.

Further, in the present embodiment, by branching from the step S202, the system controller 120 determines whether or not to perform front curtain correction control (second control) for correcting the traveling speed of the front curtain. Here, the front curtain correction control is control for making the traveling speed of the front curtain of the shutter higher than the traveling speed of the rear curtain of the shutter. In a case where the front curtain correction control is to be performed, a front curtain correction execution flag is set to 1.

On the other hand, in a case where the front curtain correction control is not to be performed (non-execution of the front curtain correction control), the traveling speed of the front curtain of the shutter is controlled such that it is equal to the traveling speed of the rear curtain of the shutter (first control). In this case, the front curtain correction execution flag is reset to 0. The system controller 120 selectively executes the first control and the second control.

In the step S203, the system controller 120 determines whether or not the provisionally determined flash light emission amount is equal to or larger than a predetermined light emission amount (light emission amount check). Then, if the provisionally determined flash light emission amount is equal to or larger than the predetermined light emission amount, it can be determined that at the current shutter speed, the time period over which flash light emission is performed does not properly fall within the full open section during which the shutter is fully open, and hence the system controller 120 proceeds to a step S204. In the step S204, the system controller 120 limits the flash light emission amount at the time of photographing to a value smaller than the provisionally determined flash light emission amount (light emission amount clip).

On the other hand, if the provisionally determined flash light emission amount is smaller than the predetermined light emission amount, the system controller 120 proceeds to the step S205. In the step S205 to which the process proceeds from the step S203 or the step S204, since the determined shutter speed is the high speed, it is not appropriate to lower the actual shutter speed for the flash synchronization time. Accordingly, in the step S205, the system controller 120 sets the front-curtain correction execution flag (sets the flag to 1). With this, in the step S110 et seq. in FIG. 6, the traveling speed of the front curtain of the shutter is controlled to be higher than the traveling speed of the rear curtain of the shutter according to the determined shutter speed.

Particularly, in the case where the process proceeds to the step S205 without executing the step S204, although the front curtain correction control is performed, the light emission amount clip is not applied, and hence the traveling patterns of the front curtain and the rear curtain are as shown in the illustrated example in FIG. 3.

On the other hand, in the case where the process proceeds to the step S205 after executing the step S204, the front curtain correction control is performed and also the light emission amount clip is applied, and hence the traveling patterns of the front curtain and the rear curtain are as shown in the illustrated example in FIG. 5.

In the case where the process proceeds from the step S202 to the step S205, the determined shutter speed is the medium speed, and hence it is not appropriate to lower the actual shutter speed for the flash synchronization time. On the other hand, it is possible to emit light by full opening of the shutter with the provisionally determined flash light emission amount. Accordingly, in the step S205, the system controller 120 sets the front curtain correction execution flag (sets the flag to 1). With this, in the step S110 et seq. in FIG. 6, the traveling speed of the front curtain of the shutter is controlled to be higher than the traveling speed of the rear curtain of the shutter according to the determined shutter speed.

In the case where the process proceeds from the step S202 to the step S205, the front curtain correction control is performed but the light emission amount clip is not applied, and hence the traveling patterns of the front curtain and the rear curtain are as shown in the illustrated example in FIG. 3.

In the step S206, since the determined shutter speed is the low speed, the necessity for increasing the actual flash synchronization shutter speed is low. Accordingly, the system controller 120 resets the front curtain correction execution flag (sets the flag to 0). Therefore, in the step S110 et seq. in FIG. 6, the front curtain and the rear curtain are controlled to travel at the same speed. This reduces exposure variation (exposure deviation) between the upper and lower end areas of the image. Since neither the front curtain correction control is performed nor the light emission clip is applied, the traveling patterns of the front and rear curtains are as shown in the illustrated example in FIG. 2.

After execution of the steps S205 or 206, the system controller 120 terminates the flash synchronization shutter speed-increasing operation process in FIG. 7.

Thus, in the flash photographing, in a case where the shutter speed is low enough to satisfy the condition of TV0>Tv value, the front and rear curtains of the shutter are controlled to the same speed, and hence it is possible to perform photographing such that the exposure variation between the upper and lower end areas of the screen is reduced (the step S206). On the other hand, even in a case where the shutter speed is high enough to satisfy the condition of Tv value≥TV0 so that the front and rear curtains are controlled to respective different traveling speeds, if the provisionally determined flash light emission amount is equal to or larger than the predetermined light emission amount, the emission amount clip is applied, so that the exposure variation between the upper and lower end areas of the screen is less liable to be caused.

According to the present embodiment, the system controller 120 as a determination unit determines the photographing parameters including the shutter speed before flash light emission photographing is performed (the step S107). The system controller 120 as a control unit determines whether to adopt execution of the front curtain correction control (second control) or non-execution of the front curtain correction control (first control) when photographing is performed, according to the shutter speed in the determined photographing parameters (the step S202).

That is, the system controller 120 adopts the first control (the step S206) in a case where the determined shutter speed is lower than the first shutter speed (TV0>Tv value) and adopts the second control (the step S205) in a case where the shutter speed is equal to or higher than the first shutter speed (TV≥TV0).

With this, it is possible to reduce the exposure variation between upper and lower end areas of the image when flash light emission photographing is performed. Further, it is possible to shorten the flash synchronization time in a case where there is a high need of making the shutter speed high.

Further, the system controller 120 controls the amount of flash light emission at the time of photographing, based on the shutter speed and the provisionally determined flash light emission amount. More specifically, in a case where the shutter speed is equal to or higher than the second shutter speed (Tv value≥TV1) and also the provisionally determined flash light emission amount is equal to or larger than the predetermined amount of light emission, the system controller 120 limits the amount of flash light emission at the time of photographing to a value smaller than the provisionally determined flash light emission amount (the step S204). In this case, the second control (the step S205) is further adopted. This makes it possible to more effectively shorten the flash synchronization time in a case where there is a high need of making the shutter speed high.

Note that in the present embodiment, the changes in the positions of the front curtain and the rear curtain from the start to the end of traveling of the shutter may be linear or nonlinear.

The threshold values TV0 and TV1, and the predetermined amount of light emission are all set to respective fixed values. However, this is not limitative, but each value may be variable, or a plurality of candidate values may be held for each value and a candidate value to be actually applied may be selected.

Although the first shutter speed and the second shutter speed are set to the different values, they may be set to the same value. Alternatively, to perform substantially the same control as this, the steps S203 and S204 may be eliminated from FIG. 7 and FIG. 10, referred to hereinafter.

Note that the first and second shutter speeds (or the threshold values TV0 and TV1), and the predetermined amount of light emission may be variably controlled based on photometric information. For example, when the photometric information is acquired, if the photographing luminance is dark, the flash light becomes dominant in photographing, and hence exposure variation caused by the speed difference between the front curtain and the rear curtain of the shutter is less noticeable. However, if the photographing luminance is bright, exposure to external light is also important. Therefore, at least one of the threshold values TV0 and TV1 or the predetermined amount of light emission may be switched, according to the photographing luminance. For example, in a case where the photographing luminance is dark, the threshold values TV0 and TV1 may be changed to smaller values (the first shutter speed and the like may be changed to a lower value).

The threshold values TV0 and TV1 may also be changed in a case where the image capturing range of the image sensor 103 changes. This will be described with reference to FIGS. 8A to 8D and 9.

Figure 8A:
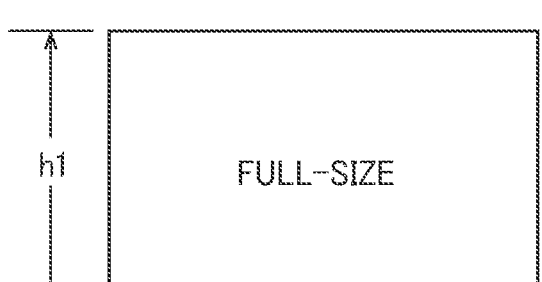
FIGS. 8A to 8D are diagrams useful in explaining a range captured by an image sensor.

FIGS. 8A to 8D are diagrams useful in explaining an image capturing range of the image sensor 103. As for the image capturing range of the image sensor 103, an original image capturing range in a case where the whole effective area of the image sensor 103 is used is as illustrated in FIG. 8A. A length in a vertical direction (vertical length) in the original image capturing range is denoted by h1.

Figure 8B:
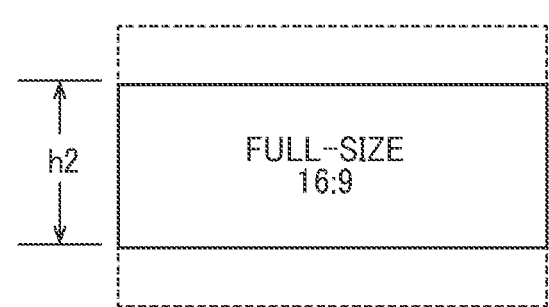
Figure 8C:
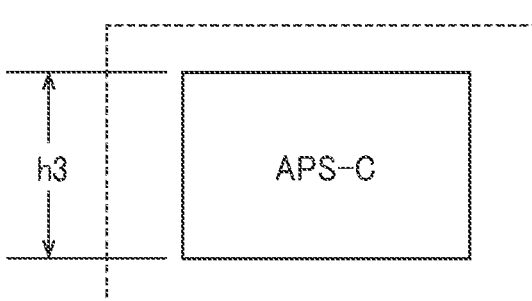
Figure 8D:
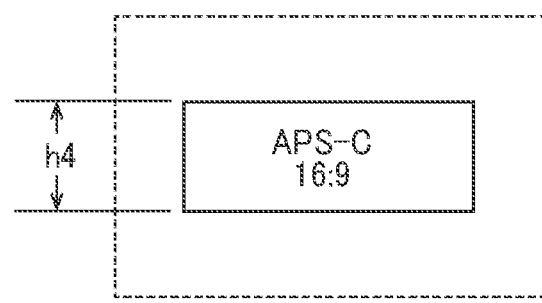

An image capturing range obtained by applying an aspect ratio of 16:9 to the original image capturing range is indicated by solid lines in FIG. 8B, and its vertical length is denoted by h2. The image capturing range of an Advanced Photo System type-C (APS-C) size is indicated by solid lines in FIG. 8C in comparison with the original image capturing range, and its vertical length is denoted by h3. The image capturing range obtained by applying the aspect ratio of 16:9 to the image capturing range of the APS-C size is indicated by solid lines in FIG. 8D, and its vertical length is denoted by h4. A relationship between the vertical lengths is expressed by h1>h2>h3>h4. Note that the image capturing range may be automatically switched according to information from the lens unit 300.

Figure 9:
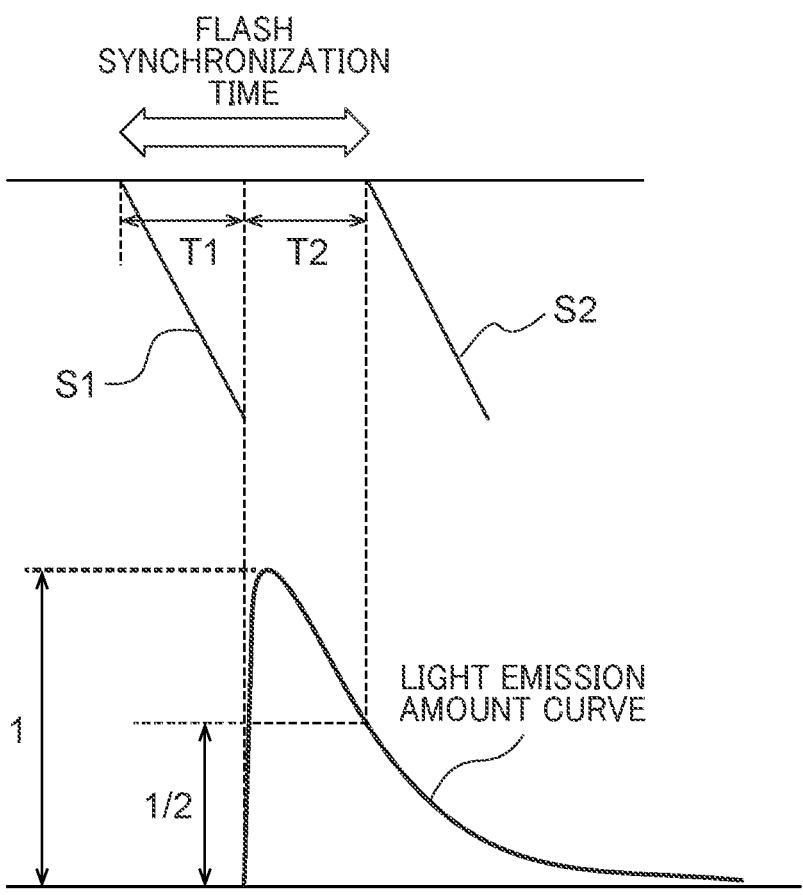
FIG. 9 is a conceptual diagram showing a relationship between a travel pattern of the front curtain and a travel pattern of the rear curtain in a case where an image capturing range is changed.

As the setting of the image capturing range is changed, the vertical length of the image capturing range is changed, and accordingly, the traveling start and end positions of the shutter are also changed. That is, the traveling distance of the shutter is changed, whereby the flash synchronization time is also changed. For example, with reference to the traveling pattern shown in FIG. 5, if the vertical length is made shorter, the time T1 and time T2 are shortened as shown in FIG. 9. As a result, the flash synchronization time is shortened.

Therefore, the system controller 120 may variably control the threshold values TV0 and TV1 based on the image capturing range. For example, the system controller 120 sets the threshold values TV0 and TV1 to larger values as the vertical length is shorter. In doing this, the threshold values TV0 and TV1 may be changed according to a ratio between the vertical length before the change and the vertical length after the change.

In a case where photographing is performed under a flicker environment, stripes are produced in the photographed image due to the influence of the flicker, depending on a shutter speed in the photographing parameters. To suppress production of the stripes, there are envisaged a method of setting the shutter speed to a value corresponding to an integral multiple of the flicker period and a method of making the shutter speed sufficiently lower than a speed corresponding to the flicker period. On the other hand, if the traveling speed of the front curtain and the traveling speed of the rear curtain are differentiated under the flicker environment, in addition to exposure variation in the upper and lower end areas of the screen, the appearance of stripes produced due to the flicker varies, and hence there is a fear that the quality of the photographed image is degraded.

To prevent this, in a variation of the present embodiment, execution of the front curtain correction control (second control) is adopted on condition that there is no flicker in the photographing environment. The present variation differs from the first embodiment in the flash synchronization shutter speed-increasing operation process and is the same as the first embodiment in the other respects.

Figure 10:
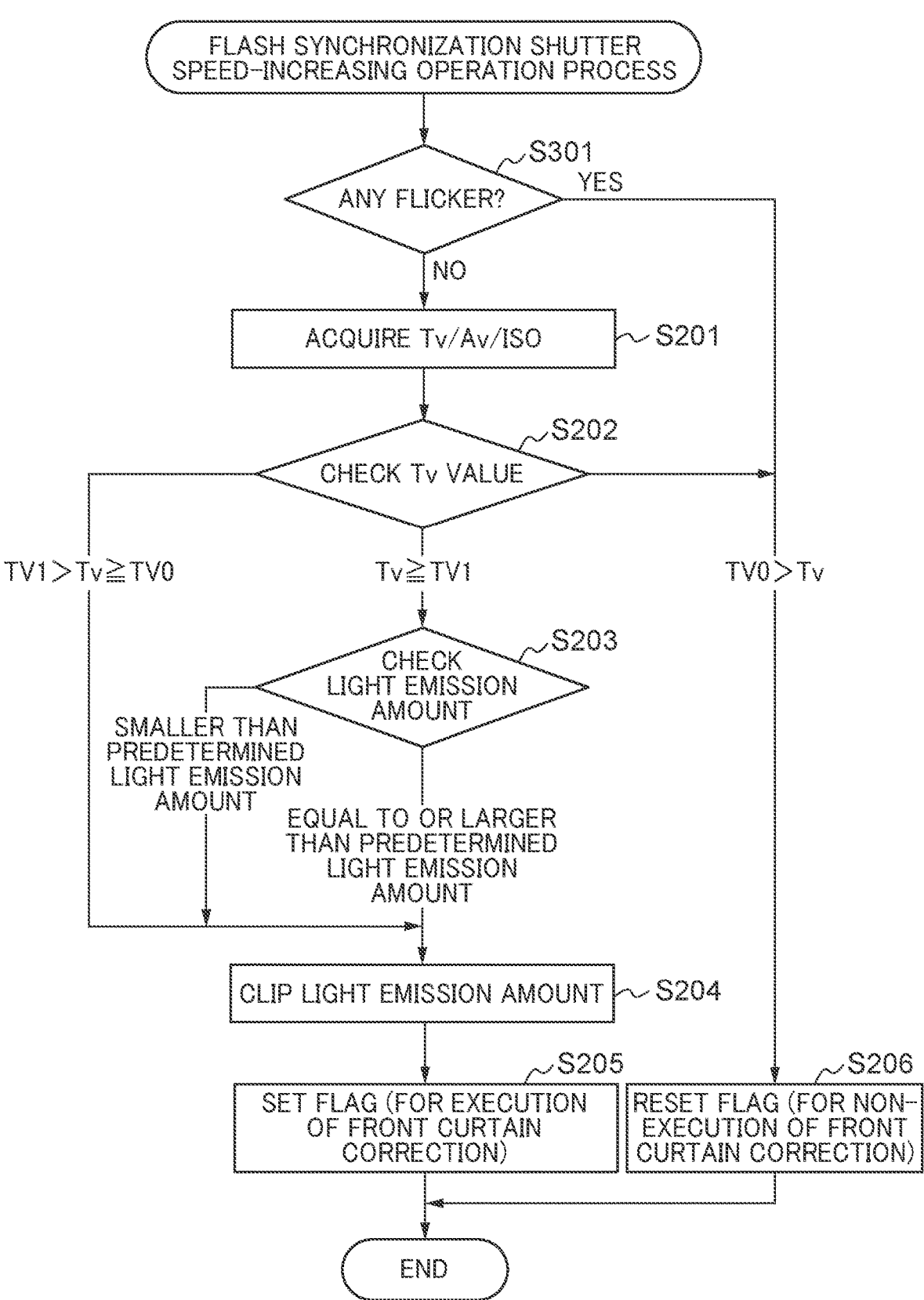
FIG. 10 is a flowchart of a variation of the flash synchronization shutter speed-increasing operation process.

FIG. 10 is a flowchart of a variation of the flash synchronization shutter speed-increasing operation process which is performed in the step S109 in FIG. 6.

In a step S301, the system controller 120 determines whether there is a flicker in the photographing environment by using a known method. Then, if there is no flicker, the system controller 120 proceeds to the step S201, whereas if there is a flicker, the system controller 120 proceeds to the step S206. The steps S201 to S206 are the same as those described with reference to FIG. 7.

Therefore, if there is a flicker, non-execution of the front curtain correction control (first control) is adopted when photographing is performed regardless of the shutter speed (the step S206).

According to the present variation, it is possible to obtain the same advantageous effects as provided by the first embodiment in reducing exposure variation between upper and lower end areas of the image when flash light emission photographing is performed while shortening the flash synchronization time. Further, since the front curtain correction control is not performed in a case where there is a flicker, it is possible to suppress degradation of the quality of the photographed image.

Note that in the present variation, even in a case where there is a flicker, the predetermined amount of light emission may be changed to a smaller value. That is, in the case where there is a flicker, in addition to the step S206, processing corresponding to the step S204 may be executed.

Note that the image capturing apparatus to which the present invention is applied is not limited to the digital camera. For example, the present invention can also be applied to an image capturing apparatus which is not referred to as the digital camera, including a portable device, such as a smartphone and a wearable terminal, an in-vehicle camera, and a security camera.

Although the operation of the camera 1 is controlled by the operations of the components of the camera 1, such as the image processor 107, the memory controller 110, and the system controller 120, in cooperation with each other, this is not limitative. For example, a program for realizing the above-described process in FIG. 6 may be stored in the main memory 121 in advance. Then, the operation of the camera 1 may be controlled by the system controller 120 or the like, including a microcomputer, that executes the program. Further, the program may be in any of forms including an object code, a program executed by an interpreter, and script data supplied to the OS, insofar as it has a program function. Further, a recording medium for supplying the program may be, for example, a magnetic recording medium, such as a hard disk or a magnetic tape, or an optical/magneto-optical recording medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-132614 filed Aug. 23, 2022, which is hereby incorporated by reference herein in its entirety.

What is claimed is:

1. An image capturing apparatus comprising:

at least one processor; and a memory coupled to the at least one processor, the memory having instructions that, when executed by the processor, perform the operations as:

a determination unit configured to determine parameters including a shutter speed before flash light emission photographing is performed; and a control unit configured to selectively execute first control for controlling a traveling speed of a front curtain of a shutter and a traveling speed of a rear curtain of the shutter to the same speed, and second control for controlling the traveling speed of the front curtain to be higher than the traveling speed of the rear curtain, wherein before flash light emission photographing is performed, the control unit determines which of the first control and the second control is to be adopted according to the shutter speed in the parameters, which is determined by the determination unit, wherein the control unit controls an amount of flash light emission when photographing is performed, based on the shutter speed, wherein before flash light emission photographing is performed, the determination unit further provisionally determines an amount of flash light emission, wherein the control unit controls the amount of flash light emission when photographing is performed based on the shutter speed and the provisionally determined flash light emission amount; and wherein in a case where the shutter speed is equal to or higher than a second shutter speed which is higher than the first shutter speed, and also the provisionally determined flash light emission amount is equal to or larger than a predetermined amount of light emission, the control unit limits the amount of flash light emission when photographing is performed, to a value smaller than the provisionally determined flash light emission amount.

2. The image capturing apparatus according to claim 1, wherein the front curtain is realized by an electronic shutter, and the traveling speed of the front curtain is a speed at which the front curtain performs reset scan on accumulated charges in an image sensor.

3. The image capturing apparatus according to claim 2, wherein the rear curtain is realized by an electronic shutter, and the traveling speed of the rear curtain is a speed at which the rear curtain performs read scan on accumulated charges in the image sensor.

4. The image capturing apparatus according to claim 1, wherein before flash light emission photographing is performed, the control unit determines whether or not there is a flicker in a photographing environment, and in a case where there is a flicker, the control unit adopts the first control when photographing is performed regardless of the shutter speed.

5. The image capturing apparatus according to claim 1, wherein the control unit variably controls the second shutter speed based on photometric information.

6. The image capturing apparatus according to claim 1, wherein the control unit variably controls the predetermined light emission amount based on photometric information.

7. The image capturing apparatus according to claim 1, wherein the control unit variably controls the second shutter speed based on an image capturing range.

8. An image capturing apparatus comprising:
at least one processor; and
a memory coupled to the at least one processor, the memory having instructions that, when executed by the processor, perform the operations as:
a determination unit configured to determine parameters including a shutter speed before flash light emission photographing is performed; and
a control unit configured to selectively execute first control for controlling a traveling speed of a front curtain of a shutter and a traveling speed of a rear curtain of the shutter to the same speed, and second control for controlling the traveling speed of the front curtain to be higher than the traveling speed of the rear curtain,
wherein before flash light emission photographing is performed, the control unit determines which of the first control and the second control is to be adopted according to the shutter speed in the parameters, which is determined by the determination unit,
wherein the control unit adopts the first control in a case where the shutter speed is lower than a first shutter speed and adopts the second control in a case where the shutter speed is equal to or higher than the first shutter speed,
wherein before flash light emission photographing is performed, the determination unit further provisionally determines an amount of flash light emission, and
wherein in a case where the shutter speed is equal to or higher than a second shutter speed which is higher than the first shutter speed, and also the provisionally determined flash light emission amount is equal to or larger than a predetermined amount of light emission, the control unit limits the amount of flash light emission when photographing is performed, to a value smaller than the provisionally determined flash light emission amount.

9. The image capturing apparatus according to claim 8, wherein the control unit variably controls the first shutter speed based on photometric information.

10. The image capturing apparatus according to claim 8, wherein the control unit variably controls the first shutter speed based on an image capturing range.

11. A method of controlling an image capturing apparatus, comprising:
determining parameters including a shutter speed before flash light emission photographing is performed; and
performing selective execution of first control for controlling a traveling speed of a front curtain of a shutter and a traveling speed of a rear curtain of the shutter to the same speed, and second control for controlling the traveling speed of the front curtain to be higher than the traveling speed of the rear curtain,
wherein said selective execution includes, before flash light emission photographing is performed, determining which of the first control and the second control is to be adopted according to the shutter speed in the determined parameters;
controlling an amount of flash light emission when photographing is performed, based on the shutter speed,
wherein before flash light emission photographing is performed, provisionally determining an amount of flash light emission,
wherein the controlling of the amount of flash light emission when photographing is performed based on the shutter speed and the provisionally determined flash light emission amount, and
wherein in a case where the shutter speed is equal to or higher than a second shutter speed which is higher than the first shutter speed, and also the provisionally determined flash light emission amount is equal to or larger than a predetermined amount of light emission, limiting the amount of flash light emission when photographing is performed, to a value smaller than the provisionally determined flash light emission amount.

12. A non-transitory computer-readable storage medium storing a program for causing a computer to execute a method of controlling an image capturing apparatus,
wherein the method comprises:
determining parameters including a shutter speed before flash light emission photographing is performed; and
performing selective execution of first control for controlling a traveling speed of a front curtain of a shutter and a traveling speed of a rear curtain of the shutter to the same speed, and second control for controlling the traveling speed of the front curtain to be higher than the traveling speed of the rear curtain,
wherein said selective execution includes, before flash light emission photographing is performed, determining which of the first control and the second control is to be adopted according to the shutter speed in the determined parameters;
controlling an amount of flash light emission when photographing is performed, based on the shutter speed,
wherein before flash light emission photographing is performed, provisionally determining an amount of flash light emission,
wherein the controlling of the amount of flash light emission when photographing is performed based on the shutter speed and the provisionally determined flash light emission amount, and
wherein in a case where the shutter speed is equal to or higher than a second shutter speed which is higher than the first shutter speed, and also the provisionally determined flash light emission amount is equal to or larger than a predetermined amount of light emission, limiting the amount of flash light emission when photographing is performed, to a value smaller than the provisionally determined flash light emission amount.

13. A method of controlling an image capturing apparatus, comprising:

determining parameters including a shutter speed before flash light emission photographing is performed; and selectively executing first control for controlling a traveling speed of a front curtain of a shutter and a traveling speed of a rear curtain of the shutter to the same speed, and second control for controlling the traveling speed of the front curtain to be higher than the traveling speed of the rear curtain, wherein before flash light emission photographing is performed, determining which of the first control and the second control is to be adopted according to the shutter speed in the parameters, adopting the first control in a case where the shutter speed is lower than a first shutter speed, and adopting the second control in a case where the shutter speed is equal to or higher than the first shutter speed, wherein before flash light emission photographing is performed, provisionally determining an amount of flash light emission, and wherein in a case where the shutter speed is equal to or higher than a second shutter speed which is higher than the first shutter speed, and also the provisionally determined flash light emission amount is equal to or larger than a predetermined amount of light emission, limiting the amount of flash light emission when photographing is performed, to a value smaller than the provisionally determined flash light emission amount.

14. A non-transitory computer-readable storage medium storing computer instructions that, when executed by a processor, cause a computer to execute a method of controlling an image capturing apparatus comprising:

determining parameters including a shutter speed before flash light emission photographing is performed; and selectively executing first control for controlling a traveling speed of a front curtain of a shutter and a traveling speed of a rear curtain of the shutter to the same speed, and second control for controlling the traveling speed of the front curtain to be higher than the traveling speed of the rear curtain, wherein before flash light emission photographing is performed, determining which of the first control and the second control is to be adopted according to the shutter speed in the parameters, adopting the first control in a case where the shutter speed is lower than a first shutter speed, and adopting the second control in a case where the shutter speed is equal to or higher than the first shutter speed, wherein before flash light emission photographing is performed, provisionally determining an amount of flash light emission, and wherein in a case where the shutter speed is equal to or higher than a second shutter speed which is higher than the first shutter speed, and also the provisionally determined flash light emission amount is equal to or larger than a predetermined amount of light emission, limiting the amount of flash light emission when photographing is performed, to a value smaller than the provisionally determined flash light emission amount.

* * * * *